(12) United States Patent
Jameson

(10) Patent No.: US 6,246,511 B1
(45) Date of Patent: Jun. 12, 2001

(54) APPARATUS AND METHOD TO COMPENSATE FOR OPTICAL FIBER AMPLIFIER GAIN VARIATION

(75) Inventor: Ralph S. Jameson, Allentown, PA (US)

(73) Assignee: Agere Systems Optoelectronics Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/372,973

(22) Filed: Aug. 12, 1999

(51) Int. Cl.[7] ............... H01S 3/30; H01S 3/10; G02B 6/34
(52) U.S. Cl. .......... 359/337; 359/160; 359/194; 359/341; 372/6; 372/32
(58) Field of Search .................. 359/160, 177, 359/194, 337, 341; 372/6, 32, 34; 305/14, 27, 37

(56) References Cited

U.S. PATENT DOCUMENTS

| | | | |
|---|---|---|---|
| 4,938,556 | * | 7/1990 | Digonnet et al. ............ 372/6 |
| 5,042,898 | * | 8/1991 | Morey et al. ............... 385/37 |
| 5,677,779 | * | 10/1997 | Oda et al. ................. 359/194 |
| 5,703,978 | * | 12/1997 | DiGiovanni et al. ......... 385/37 |
| 5,757,540 | * | 5/1998 | Judkins et al. ............ 359/341 |
| 5,793,917 | * | 8/1998 | Yoshimura ................ 385/100 |
| 5,812,572 | * | 9/1998 | King et al. ............... 372/38 |
| 5,859,945 | * | 1/1999 | Kato et al. ............... 385/89 |
| 5,867,305 | * | 2/1999 | Waarts et al. ............. 359/341 |
| 5,875,203 | * | 2/1999 | Wagener et al. ........... 372/6 |
| 5,894,533 | * | 4/1999 | Heise et al. .............. 385/14 |
| 5,920,423 | * | 7/1999 | Grubb et al. ............. 359/341 |
| 5,930,030 | * | 7/1999 | Scifres .................. 359/341 |

FOREIGN PATENT DOCUMENTS

9703233 * 2/1997 (GB).

OTHER PUBLICATIONS

Vivek et al, IEEE Trans. on Instru. & Measur., vol. 46, 190 5, Abstract only herewith, Oct. 1997.*
Hai et al, Chinese Journ. of Losers, v B2, #5, pp. 399–404, Abst. only herewith, Oct. 20, 1993*
Yamada et al, IEEE Journ. of Quant. Electron., vol. 28, #3, pp. 640–649, Mar. 1992.*
Zhipeng et al, Journ. of Fudan University, vol. 38, #3, pp. 272–276, Abstract only herewith, Jun. 1999.*

\* cited by examiner

Primary Examiner—Nelson Moskowitz
(74) Attorney, Agent, or Firm—Dickstein Shapiro Morin & Oshinsky LLP

(57) ABSTRACT

A system is provided for partially or completely offsetting optical fiber amplifier gain spectrum variations due to temperature by setting the optical pump signal leading into the amplifier to a desired wavelength value. Optical fiber amplifiers have gain spectrum variations associated with temperature and gain spectrum variations associated with the optical pump signal wavelength. By controlling the optical pump signal wavelength supplying the amplifier, the optical fiber amplifier gain variations due to temperature can be partially or completely offset, which helps minimize total amplifier spectral gain variations. The invention is applicable to dense wavelength division multiplexing (DWDM) systems.

37 Claims, 6 Drawing Sheets

APPARATUS AND METHOD TO COMPENSATE FOR OPTICAL FIBER AMPLIFIER GAIN VARIATION

BACKGROUND OF THE INVENTION

1. Field of the Invention

The present invention relates generally to optical communications. Specifically, this invention relates to controlling the variation of optical fiber amplifier gain due to changes in temperature.

2. Description of the Related Art

Optical fiber communications systems provide for low loss and very high information carrying capacity. Most advanced optical fiber communication systems now in place owe success and operating characteristics to optical fiber amplifiers such as the erbium-doped fiber amplifier (EDFA). The gain bandwidth of this amplifier is sufficient to permit simultaneous amplification of multiple channels and, for this reason may be used for dense wavelength division multiplexing (DVVDM).

In optical fiber amplifiers, like EDFAs, for DWDM systems the gain spectrum is required to be approximately uniform. However, as the temperature of the optical fiber varies, the shape of the gain spectrum changes significantly. It would be useful to control this variation of gain or to compensate within the amplifier for the variation.

Several solutions have been proposed or attempted. One of the attempted solutions deals with controlling the temperature of the optical fiber with a heater. This solution though causes high heat in the optical fiber which reduces the overall life and reliability of the optical fiber.

Another proposed solution involves gain flattening filters which have a transmission spectrum that varies with temperature in an appropriate manner related to the gain spectrum. However, this option has not been shown to be commercially viable.

SUMMARY OF THE INVENTION

The present invention provides a method and apparatus for controlling optical fiber amplifier gain due to temperature, and hence the output signal of the optical fiber amplifier.

According to one aspect of the present invention, an optical pump signal which has a certain wavelength is received by an optical fiber amplifier. The amplifier has a gain variation caused by temperature and a gain variation caused by the wavelength of the optical pump signal received. The gain variation due to temperature may be counteracted by the gain variation due to changes in optical pump wavelength. Moreover, an optical pump signal with a desired wavelength may be set by the present invention, and the set pump signal may be used to cause a gain which acts to partially or completely offset the optical fiber amplifier gain variation caused by temperature.

An optical fiber amplifier has an associated gain spectrum which is dependent upon temperature and upon optical pump signal wavelength. A change in either the temperature or the wavelength of the optical pump signal may cause a change in the gain spectrum. FIG. 1 illustrates, in graph form, the difference in gain variation of the same optical fiber amplifier between the amplifier gain at a temperature of −5° C. and the amplifier gain at a temperature of 70° C.

FIG. 2 graphically illustrates the gain variation of an optical amplifier due to changes in the optical pump signal wavelength. Specifically, FIG. 2 graphically illustrates the gain of an optical fiber amplifier at a wavelength of 972.5 nm and compares that with the gain of the same optical fiber amplifier at a wavelength of 980 nm.

The present invention may be used to minimize gain variation due to temperature (FIG. 1) by offsetting this change in gain with changes in optical amplifier gain from pump wavelength (FIG. 2). For example, referring to FIG. 1, where the fiber temperature is 70° C., at the amplifier's spectrum range value of 1540 nm, there is a positive dB factor. The same optical fiber amplifier energized by a 980 nm pump laser, as seen in FIG. 2, at the amplifier's spectrum range value of 1540 nm, shows a negative dB factor. Accordingly, the positive gain at 1540 nm (FIG. 1) can be partially or completely offset by the negative gain of a 980 nm pump laser wavelength (FIG. 2).

Various kinds of optical fiber amplifiers are available and each one has an associated gain variation for temperature and an associated gain variation for optical pump signal wavelength. Each different amplifier will have a unique gain curve which is different from the gain curves represented in FIGS. 1 and 2. Specifically, FIGS. 1 and 2 represent the gain curves of a typical 1725-CBJA2 optical fiber amplifier. The concept of partially or completely offsetting the amplifier gain due to temperature would be the same for other optical fiber amplifiers.

Various methods and devices may be used to modify the optical pump signal wavelength to the extent required. These methods and devices include using a fiber grating device, control systems, and a ring reflector cavity system.

The fiber grating device can make use of high thermal variation glass or the use of an external Bragg reflector. According to another aspect of the invention, a Bragg reflector may be packaged such that any change in temperature applies stress to the Bragg reflector which changes the optical pump signal wavelength.

According to another aspect of the invention, a Fabry-Perot cavity may be used to create a phase shift. The phase shift can be used to set the optical pump wavelength characteristics as required to partially or completely offset optical amplifier gain due to temperature. The Fabry-Perot cavity can be a bulk Fabry-Perot cavity or make use of two Bragg reflectors as applied in a compound Bragg reflector Fabry-Perot cavity.

According to another aspect of the invention, a controller may be used to adjust the temperature of the optical pump signal source or to proportion the amount of optical pump signal portions combined to form an optical pumps signal with the desired wavelength characteristics.

According to another aspect of the invention, a ring reflector cavity system may be used to control amplifier gain due to temperature by altering the optical pump wavelength. The ring-reflector cavity systems may include the use of a long period grating filter, a dielectric filter, or an optical isolator.

These and other advantages and features of the invention will become apparent from the following detailed description of the invention which is provided in connection with the accompanying drawings.

DETAILED DESCRIPTION OF PREFERRED EMBODIMENTS

The present invention will be described with reference to the embodiments illustrated in FIGS. 3–14. Other embodiments may be utilized and structural changes may be made without departing from the spirit or scope of the present invention.

Figure 1:
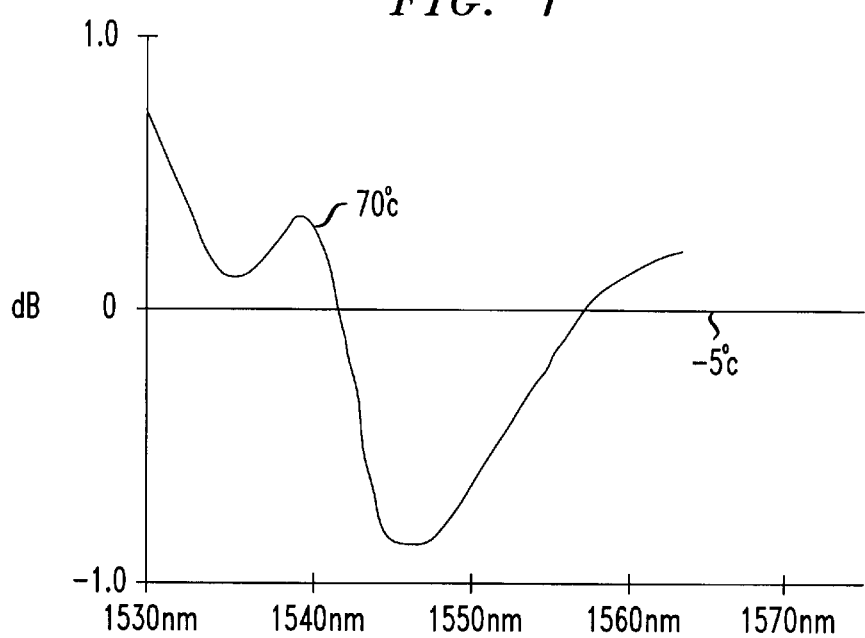
FIG. 1 is a graph showing the difference in gain of an optical fiber amplifier at −5 degrees Celsius and the same optical fiber amplifier at 70 degrees Celsius.
Figure 2:
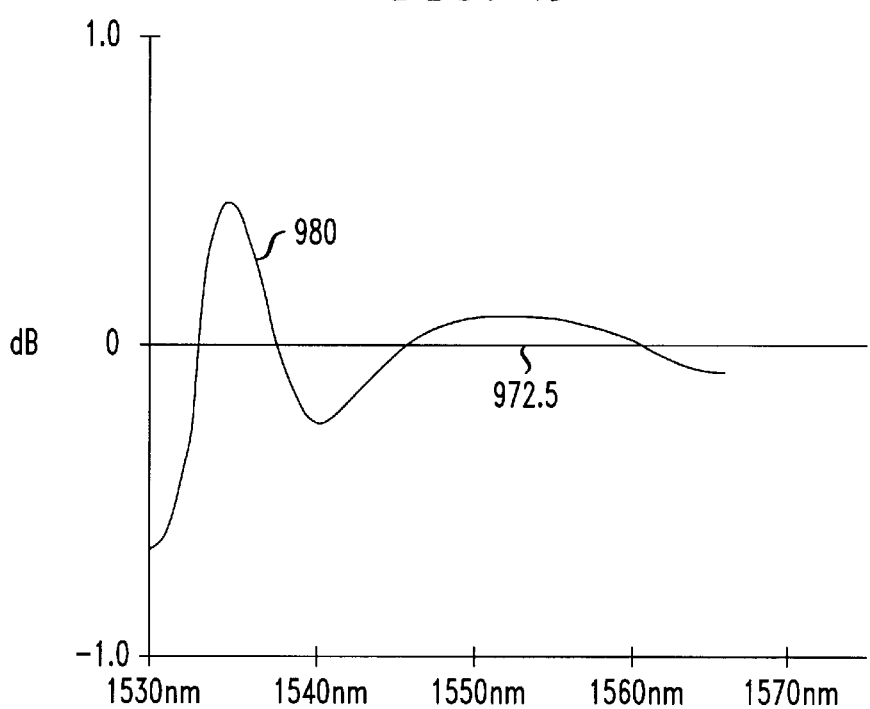
FIG. 2 is a graph showing the difference in gain of an optical fiber amplifier at a wavelength of 972.5 nm and the same optical fiber amplifier at a wavelength of 980 nm.
Figure 3:
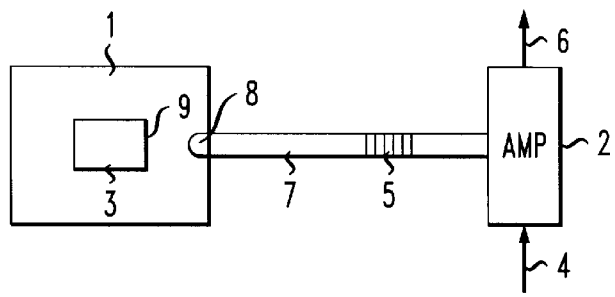
FIG. 3 is a diagram of a first embodiment of the present invention, which uses a fiber grating device to select an optical signal wavelength which partially or completely offsets the amplifier gain due to temperature.

FIG. 3 illustrates a pump laser package 1 that contains a laser chip 3 where the laser chip 3 has a front facet 9. An optical fiber 7 is connected to the pump package 1 by a fiber pigtail 8. Along the optical fiber 7 is a fiber grating device 5, such as a Bragg reflector. The optical signal travels from the pump laser package 1 through the fiber grating device 5 and into an optical fiber amplifier 2. An input transmission line 4 leads into the amplifier 2 and is connected to the erbium doped fiber (not illustrated). An output transmission fine 6 leads out of the erbium doped fiber.

The fiber grating device 5 is formed by exposing the fiber 7 to ultraviolet light. The ultraviolet light causes a disruption in the glass core of the optical fiber 7. What this disruption causes at-a very slight level is a change of the refractive index of the glass in the fiber 7. The change in refractive index allows only signals within a very narrow set of wavelength ranges to pass through the fiber grating 5. Therefore, the fiber grating 5 can be used to set the wavelength of the optical signal incident on the amplifier 2. In an alternative embodiment of the invention, the fiber grating device 5 may employ reflectors, such as mirrors or dielectric filters, to limit the spectrum of the input signal at the amplifier 2 to a certain wavelength range.

In operation, the pump laser package 1 produces an optical signal, with a certain wavelength, which travels through the optic fiber 7. The pump laser package 1 operates in a range of from about 950 nm to about 1000 nm with the typical optical signal in a range of from about 970 nm to about 990 nm. The optical signal is propagated through the grating device 5. The grating device 5 affects the wavelength characteristic of the pump laser signal by reflecting a portion of the signal back into the pump laser as a feedback signal. This feedback signal causes the pump laser signal to have the same wavelength as the reflection of the grating device 5. The wavelength of the reflection changes with changes in temperature in a manner that partially or completely offsets the gain change due to temperature in the optical fiber amplifier 2. Finally, an amplified optical signal is transmitted from the amplifier 2 along the output optical fiber 6. The embodiment shown in FIG. 3 does not require a temperature sensor because the fiber grating device 5 may be arranged to change in an appropriate and corresponding manner with the temperature gain characteristics of the optical fiber amplifier 2.

Figure 4:
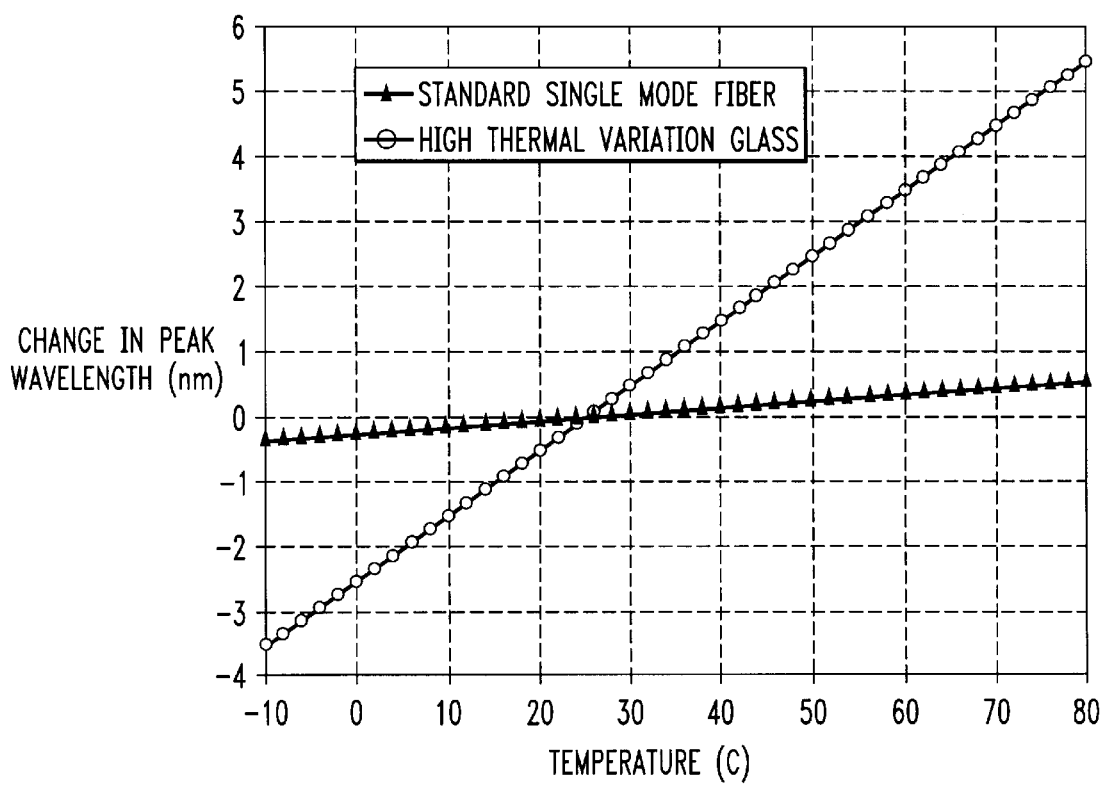
FIG. 4 is a graph showing obtainable wavelengths in a Bragg reflector for a single mode fiber and a high thermal variation glass fiber.

The use of a fiber grating device to set the wavelength of the optical signal may require the use of high thermal variation glass. FIG. 4 illustrates the broad spectrum of wavelengths available when using high thermal variation glass as compared with standard single mode fiber. For systems where the range of pump laser wavelength variation is large, a high thermal variation glass fiber may be used.

Figure 5:
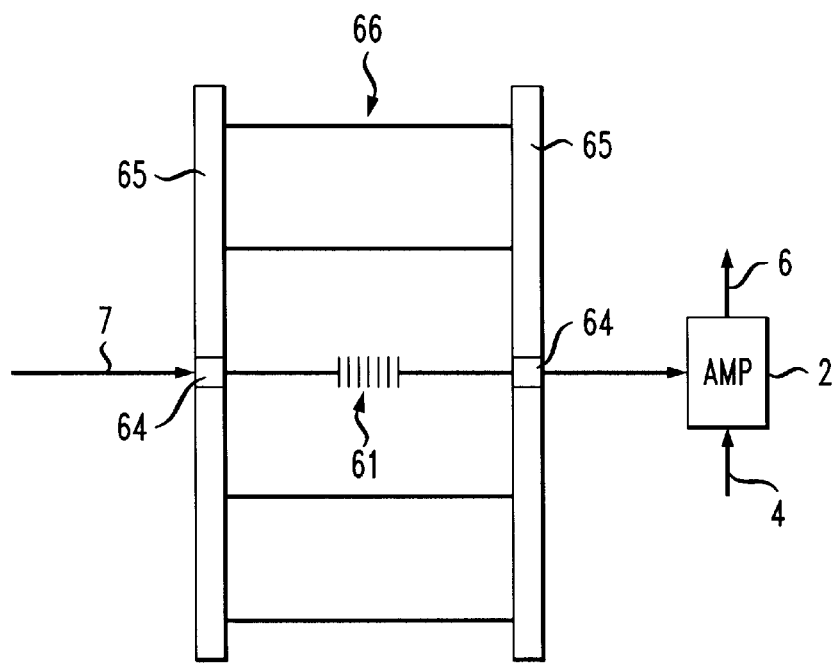
FIG. 5 is an illustration of an optical communication system with a Bragg reflector device for setting a desired optical signal wavelength.

Referring now to FIG. 5, a Bragg reflector 61 may be located in the optical fiber 7. The fiber 7 transmits signals to the optical fiber amplifier 2. In the FIG. 5 embodiment, the optical fiber 7 is fixed to supports 64 by epoxy or other structure. Mechanical stress applied to the Bragg reflector 61 is adjusted by support mounts 65 and thermal expansive material 66. The optical signal travels through the optical fiber 7 and into the Bragg reflector 61. As the temperature changes, the thermal expansive material 66 expands or contracts. This expansion or contraction applies or relieves stress on the Bragg reflector 61, thereby changing the wavelength of the reflection from the Bragg reflector 61 and hence the wavelength of the optical pump signal applied to the amplifier 2.

By knowing the gain characteristics of the optical fiber amplifier 2, an appropriate Bragg reflector and thermal expansive material 66 can be selected. The selected wavelength of the optical signal may be confined to a very narrow range, if desired. This set optical signal wavelength may be used to partially or completely offset the gain due to temperature in the amplifier 2.

Figure 6:
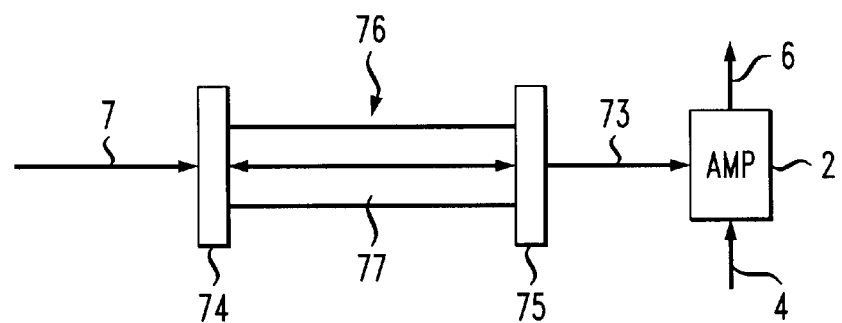
FIG. 6 is an illustration of an optical communication system with a bulk Fabry-Perot cavity.

FIG. 6 illustrates an apparatus that has two partially reflective mirrors 74, 75 which form a Fabry-Perot cavity 76 along the optical fiber 7. The cavity 76 circulates reflected optical pump signals which also overlap the incoming optical pump signal. Also, a temperature sensitive material 77 is used between the mirrors 74, 75. With changes in temperature, the temperature sensitive material 77 changes the length of the cavity 76 to alter the wavelength of the output pump signal on line 73. By knowing the gain characteristics of the optical fiber amplifier 2, the appropriate partially reflective mirrors 74, 75 and temperature sensitive material 77 can be selected to form a cavity 76 which sets the optical pump signal wavelength transmitted to the amplifier 2 to partially or completely offset the amplifier 2 gain due to temperature.

Figure 7:
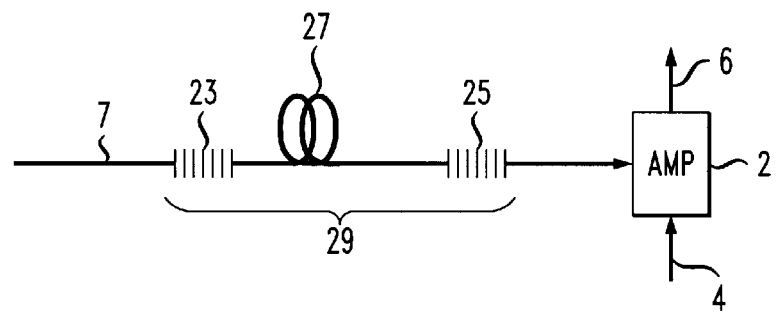
FIG. 7 is a diagram showing a second embodiment of the invention, which has a compound Bragg reflector for selecting an optical signal wavelength which partially or completely offsets the amplifier gain due to temperature.

Another form of a Fabry-Perot cavity uses multiple Bragg reflectors as seen in FIG. 7. In the apparatus shown in FIG.

7, an optical pump signal travels through the optical fiber 7, through a first fiber optic grating device 23 (a Bragg reflector), through a suitable separation distance of optical fiber 27, through a second fiber grating device 25 (A Bragg reflector) and ultimately into the optical fiber amplifier 2. The wavelength characteristics of the optical pump signal are changed as a result of optical feedback from the Fabry-Perot cavity 29. The Fabry-Perot cavity 29 causes a phase shift that is correlated to temperature. With suitable placement and selection of the fiber grating devices 23,25, an accurate phase shift can be applied to the optical signal to set the optical pump signal wavelength which partially or completely offsets gain due to temperature in the amplifier 2.

Figure 8:
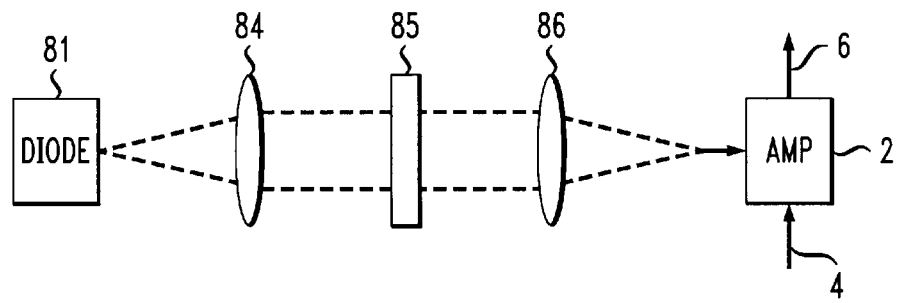
FIG. 8 is an illustration of a system that includes a temperature varying dielectric filter for use in the present invention.

Referring now to FIG. 8, a diode 81 emits an optical pump signal with a broad spectrum which travels through coupling lenses 84, a temperature varying dielectric filter 85, and through lenses 86. Portions of the optical pump signal are reflected by the dielectric filter 85 and focussed back into the laser diode 81. Use of the dielectric filter 85 limits the optical pump signal, incident on the amplifier 2, to a narrow wavelength range. The optical pump signal set by the filter 85 may be used to partially or completely offset the optical fiber amplifier gain changes due to temperature. Finally, an amplified signal with reduced amplifier gain variation is transmitted along an optical output fiber 6.

Figure 9:
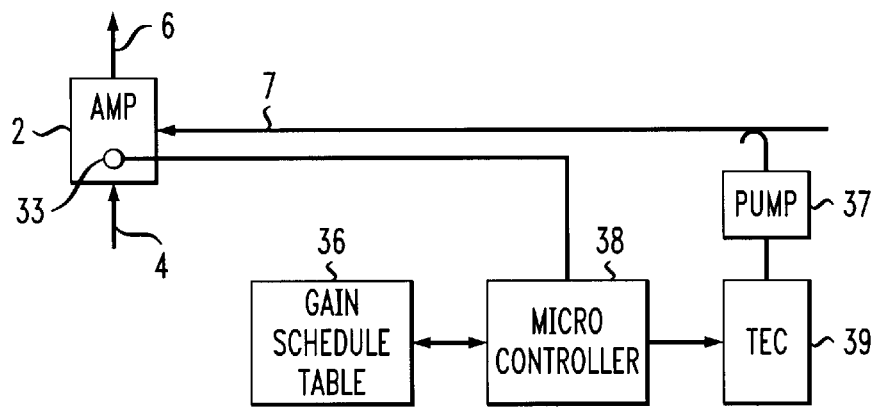
FIG. 9 is a diagram of a third embodiment of the invention which employs a controller and gain schedule look-up table.

Referring now to FIG. 9, the wavelength characteristics of the pump signal incident on the amplifier 2 may be controlled by heating the pump 37 which generates the optical pump signal. The pump signal generated by the pump 37 is transmitted through the optical fiber 7 and ultimately into the optical fiber amplifier 2. A sensor 33 measures the temperature of the erbiumdoped fiber. The signals from the sensor 33 are transmitted to a controller 38.

Based upon the sensed temperature, the controller 38 determines a desired optical pump signal wavelength value based upon a gain schedule table 36. When a desired wavelength is determined, the controller 38 sends a corresponding signal to control a thermo-electric cooler (TEC) 39. The TEC 39 heats the pump 37, thereby causing the pump 37 to emit an optical pump signal with the set wavelength which will partially or completely offset gain changes due to temperature of the optical fiber amplifier 2 signal. The TEC 39 may also adjust the temperature of the pump 37 by adjusting a chip 3, see FIG. 3, located within the pump laser package 1.

Figure 10:
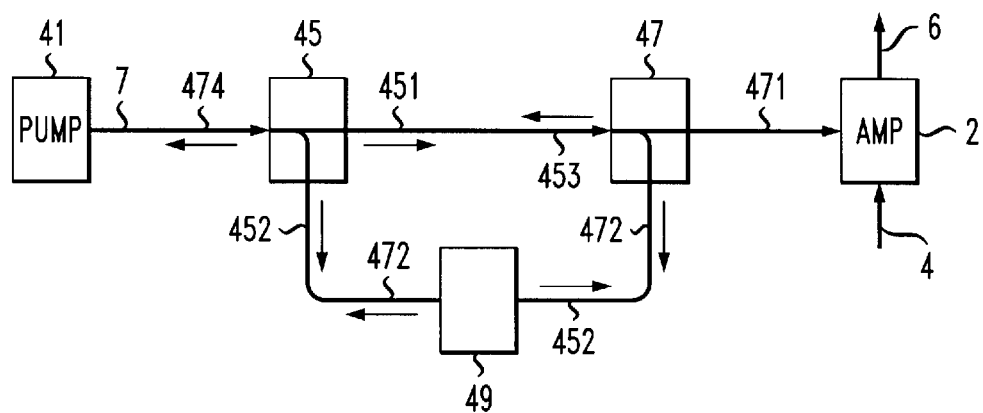
FIG. 10 is a diagram of a fourth embodiment of the invention which uses a ring-reflector cavity to select an optical signal wavelength which partially or completely offsets the amplifier gain due to temperature.

A still further embodiment of the present invention is illustrated in FIG. 10. The FIG. 10 embodiment has a pump laser 41 which generates an optical signal transmitted through the optical fiber 7 to a first splitter 45. The optical signal is split by the splitter 45. One of the split signals 451 is sent to a second splitter 47. The other split signal 452 is sent first to a narrow pass band filter 49, and then on to the second splitter 47. At second splitter 47, the split signal 452 is coupled onto optical fiber 7, to become the first feedback signal 453 travelling towards the pump laser 41 in the direction opposite to the direction of split signal 451. The second splitter 47 receives the first split signal 451, and splits it again, sending one of the split signals 471 on to the optical fiber amplifier 2. The other split signal 472 travels to the narrow band pass filter 49 and is then coupled by first splitter 45 onto the optical fiber 7 as second feedback signal 474 travelling toward the pump laser 41. First and second feedback signals 453 and 474 are used to set the pump laser wavelength by locking or affecting the optical signal on line 7 to partially or completely offset gain due to temperature of the optical fiber amplifier 2.

Figure 11:
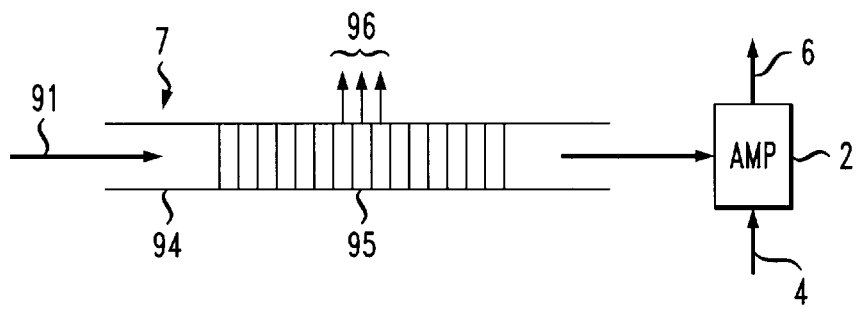
FIG. 11 is an illustration of a system that includes a long period fiber grating device for use in the present invention.

The narrow pass band filter 49, see FIG. 10, may be a long period grating filter as seen in FIG. 11. The long period grating filter receives incoming optical signal 91 which is fed through an optical fiber 7. The core 94 of the optical fiber 7 contains a long grating 95 which has reflective characteristics causing scattered optical signals 96. The long period grating device scatters all optical signals but the optical signal with the required wavelength to partially or completely offset the optical fiber amplifier gain due to temperature. The optical signal with the set wavelength is then transmitted into the optical fiber amplifier 2.

Figure 12:
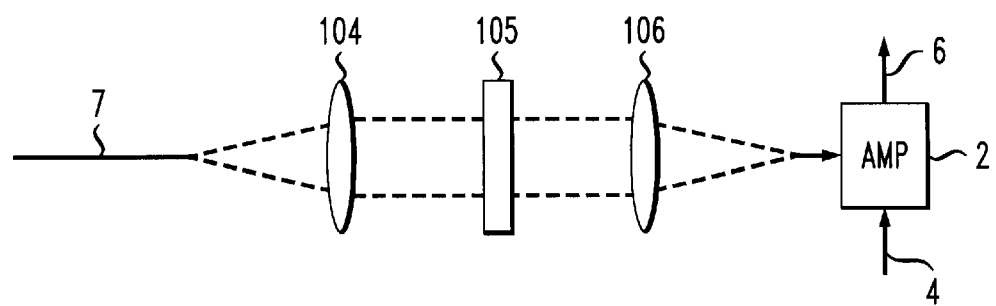
FIG. 12 is an illustration of a system that includes a dielectric filter used within a narrow pass band filter.

The narrow pass band filter 49, see FIG. 10, may also be a dielectric filter as depicted in FIG. 12. In this system an optical pump signal is transmitted through an optical fiber 7, into a lens or group of lenses 104, a dielectric filter 105, a second lens or set of lenses, and ultimately through an optical fiber amplifier 2. The optical pump signal is filtered by the dielectric filter 105 to set the optical signal wavelength to partially or completely offset the optical fiber amplifier 2 gain due to temperature.

Figure 13:
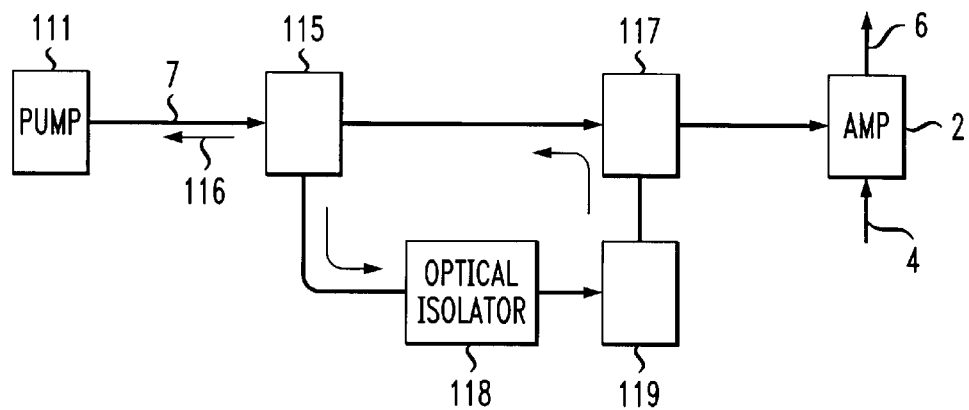
FIG. 13 is an illustration of a system that includes a unidirectional ring reflector cavity and an optical isolator.

As seen in FIG. 13, an optical pump 111 generates an optical signal which is transmitted through an optical fiber 7 and into a first splitter 115. The first splitter 115 sends a portion of the optical pump signal to a second splitter 117 and a portion into a ring reflector cavity which contains an optical isolator 118 and a filter 119. The second splitter 117 transmits the feedback signal 116 from the ring reflector cavity back towards the pump 111 and transmits the forward optical pump signal to the optical fiber amplifier 2. The ring reflector cavity, which includes the optical isolator 1 18 and filter 119, and splitters 115, 117 works to set the optical pump signal wavelength transmitted to the optical fiber amplifier 2 by providing optical feedback to the pump 111. By knowing the gain characteristics of the optical fiber amplifier 2 an appropriate optical isolator 118 and filter 119 can be selected which will work to set the optical pump signal wavelength. The set wavelength will partially or completely offset the optical fiber amplifier 2 gain due to temperature.

Figure 14:
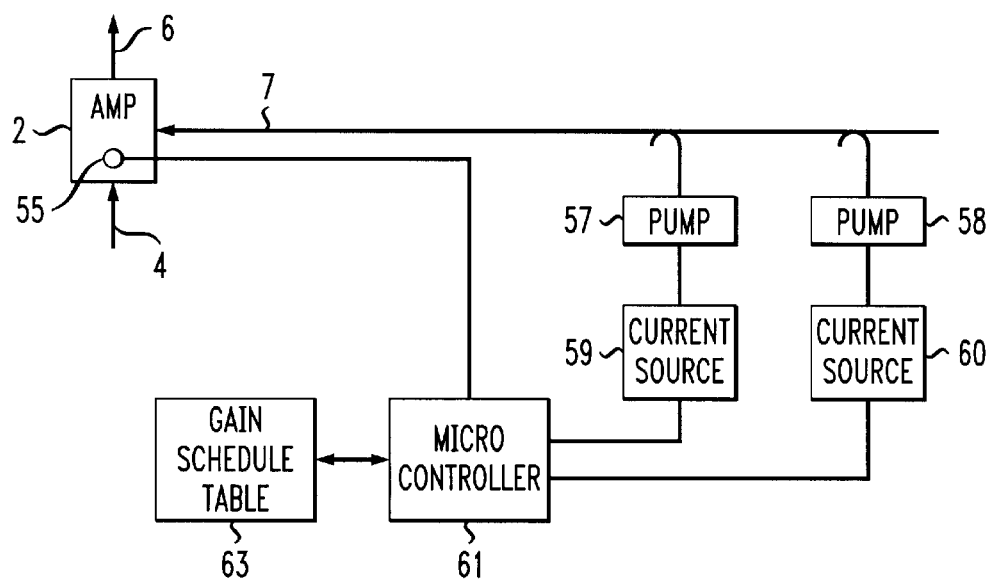
FIG. 14 is a diagram of a fifth embodiment of the invention.

The apparatus shown in FIG. 14 controls two pumps 57, 58 and their proportional input to create a combined optical signal. Specifically, an optical signal is generated through the pumps 57, 58. The first pump 57 generates an optical pump signal portion which is combined with an optical pump signal portion generated by the second pump 58 to form the optical pump signal for the system. The optical pump signal is transmitted through the optical fiber 7 and ultimately into the optical fiber amplifier 2.

The temperature of the erbium-doped fiber in the amplifier is measured by a suitable temperature sensor 55. The pumps 57, 58 are driven by respective current sources 59, 60. A controller 61 receives the temperature reading from the temperature sensor 55. Based upon this temperature reading the controller 61 uses a gain schedule look up table 63 to determine the desired optical pump signal wavelength and the proper proportions of the optical pump signal portions required from the pumps 57, 58. The controller 61 then controls the amount of current applied by the sources 59, 60 to control the proportion of the optical pump signal portions from the pumps 57, 58 and thereby set the optical pump signal wavelength to a value which will partially or completely offset gain due to temperature of the optical fiber amplifier 2. The pumps 57, 58 may be a pump laser, for example, such as a 980 nm pump laser.

Reference has been made to embodiments in describing the invention. However, additions, deletions, substitutions, or other modifications which would fall within the scope of the invention defined in the claims may be implemented by those skilled in the art and familiar with the disclosure of the invention without departing from the spirit or scope of the invention. Accordingly, the invention is not to be considered as limited by the foregoing description, but is only limited by the scope of the appended claims

What is claimed as new and desired to be protected by Letters Patent of the United States is:

1. A method of controlling gain of an optical fiber amplifier, comprising the steps of:
   generating an optical pump signal for inputting into said optical fiber amplifier; and
   modifying the wavelength characteristics of said optical pump signal, after said generating, using a fiber grating device.

2. A method of controlling gain of an optical fiber amplifier comprising the steps of:
   generating an optical pump signal for inputting into said optical fiber amplifier; and
   modifying the wavelength characteristics of said optical pump signal, after said generating using a Bragg reflector.

3. A method according to claim 2 further comprising the step of applying stress to said Bragg reflector by changing the temperature of a thermal expansive material.

4. A method of controlling gain of an optical fiber amplifier comprising the steps of:
   generating an optical pump signal for inputting into said optical fiber amplifier; and
   modifying the wavelength characteristics of said optical pump signal, after said generating, using a Fabry-Perot cavity.

5. A method according to claim 4, further comprising the step of using a bulk Fabry-Perot cavity to modify the wavelength characteristics of said optical pump signal.

6. A method according to claim 4, further comprising the step of using a compound Bragg reflector to modify the wavelength characteristics of said optical pump signal.

7. A method according to claim 1, wherein said optical fiber amplifier includes an ebrium-doped fiber.

8. A method according to claim 1, wherein said optical signal is generated by a pump laser.

9. A method according to claim 8, wherein said pump laser operates in a range of from about 950 nm to about 1000 nm.

10. A method according to claim 9, wherein said pump laser operates in a range of from about 970 nm to about 990 nm.

11. A method of controlling gain of an optical fiber amplifier, said method comprising the steps of:
    combining first and second optical pump signal portions to form a combined optical signal;
    sensing the temperature of an optical fiber associated with said optical fiber amplifier; and
    using a controller to control said first optical pump signal portion and said second optical pump signal portion, based upon said optical fiber temperature and a gain schedule look-up table, to modify the wavelength characteristics of said optical signal by varying the proportions of said first optical signal portion and said second optical signal portion.

12. A method according to claim 11, wherein said optical fiber amplifier includes an erbium-doped fiber.

13. A method according to claim 11, further comprising the steps of:
    generating said first optical signal portion by using a first pump laser; and
    generating said second optical signal portion by using a second pump laser.

14. A method according to claim 13, wherein said first and second pump lasers are 980 nm wavelength pumps.

15. A method according to claim 11, further comprising the steps of controlling a first current source for supplying a drive current for said first optical signal portion; and controlling a second current source for supplying a drive current for said second optical signal portion.

16. A method of controlling gain of an optical fiber amplifier, said method comprising the steps of:
    inputting an optical pump signal into said optical fiber amplifier; and
    using a ring-reflector cavity, which varies with temperature, to modify the wavelength characteristics of said optical pump signal.

17. A method according to claim 16, wherein said optical fiber amplifier includes an erbium-doped fiber.

18. A method according to claim 10, further comprising the step of filtering the optical signal within the ring-reflector cavity through a narrow pass band filter.

19. A method according to claim 18, further comprising the step of sending a feedback signal from said narrow pass band filter to a signal source.

20. A method according to claim 16, further comprising the step of filtering the optical signal within the ring-reflector cavity through a long period grating filter.

21. A method according to claim 16, further comprising the step of filtering the optical signal through a dielectric filter.

22. An apparatus for controlling gain in an optical system, said apparatus comprising:
    a source for generating an optical pump signal;
    an optical fiber amplifier for receiving said optical pump signal; and
    a control device for setting the wavelength characteristics of the optical pump signal after it has been generated by the source to offset changes in gain due to temperature changes in said optical fiber amplifier.

23. An apparatus according to claim 22, wherein said control device comprises a fiber grating device.

24. An apparatus according to claim 23, wherein said fiber grating device includes a temperature responsive Bragg reflector.

25. An apparatus according to claim 24, wherein said fiber grating device includes high thermal variation glass.

26. An apparatus according to claim 24, further comprising a thermal expansive material for applying stress to said Bragg reflector responsive to temperature.

27. An apparatus according to claim 22, wherein said control device comprises a Fabry-Perot device.

28. An apparatus according to claim 27, wherein said Fabry-Perot device includes a bulk Fabry-Perot cavity.

29. An apparatus according to claim 27, wherein said Fabry-Perot cavity is a compound Bragg reflector.

30. An apparatus according to claim 22, wherein said control device comprises a temperature varying dielectric filter.

31. An apparatus according to claim 22, wherein said optical fiber amplifier includes an erbium-doped fiber.

32. An apparatus for controlling gain in an optical system, said apparatus comprising:

a source for generating an optical pump signal;

an optical fiber amplifier for receiving said optical pump signal;

a control device for setting the wavelength characteristics of the optical pump signal in accordance with a predetermined gain relationship to offset optical fiber amplifier gain variations due to temperature;

said control device comprising a sensor for measuring temperature along an optical fiber associated with said optical fiber amplifier; and a heater for adjusting the temperature of said source.

33. An apparatus for controlling gain an optical system, said apparatus comprising:

a fiber for transmitting an optical pump signal to an amplifier, said optical pump signal having a set of wavelength characteristics; and a device for modifying said set of wavelength characteristics to offset amplifier gain variations due to temperature, wherein said device modifies said set of wavelength characteristics based upon a predetermined gain relationship stored in a gain schedule look-up table.

34. The apparatus of claim 32, wherein the predetermined gain relationship is stored in a gain schedule look-up table.

35. A method of controlling gain of an optical fiber amplifier, said method comprising the steps of:

inputting an optical signal in said optical fiber amplifier; and modifying the wavelength characteristics of said optical signal in accordance with a predetermined gain relationship, to offset amplifier gain variations due to temperature by measuring the temperature of an optical fiber connected to said optical fiber amplifier; and adjusting the temperature of said pump laser.

36. A method according to claim 35, further comprising the step of using a gain look-up table to determine a proper heat setting for said pump laser.

37. A method according to claim 35, further comprising the step of adjusting the temperature of said pump laser by adjusting the temperature of a chip located within said pump laser.

* * * * *